(12) United States Patent
Kasuga et al.

(10) Patent No.: US 7,827,823 B2
(45) Date of Patent: Nov. 9, 2010

(54) OPTICAL GLASS, PRECISION PRESS-MOLDING PREFORM, PROCESS FOR PRODUCING THE PREFORM, OPTICAL ELEMENT AND PROCESS FOR PRODUCING THE ELEMENT

(75) Inventors: Yoshiko Kasuga, Koganei (JP); Xuelu Zou, Akishima (JP)

(73) Assignee: Hoya Corporation, Tokyo (JP)

( * ) Notice: Subject to any disclaimer, the term of this patent is extended or adjusted under 35 U.S.C. 154(b) by 15 days.

(21) Appl. No.: 12/457,821

(22) Filed: Jun. 23, 2009

(65) Prior Publication Data

US 2009/0288450 A1 Nov. 26, 2009

Related U.S. Application Data

(62) Division of application No. 11/273,621, filed on Nov. 15, 2005, now abandoned.

(30) Foreign Application Priority Data

Nov. 15, 2004 (JP) ............................. 2004-330047

(51) Int. Cl.
C03B 11/00 (2006.01)
C03C 3/066 (2006.01)
(52) U.S. Cl. .................... 65/64; 65/63; 501/77; 501/78; 501/79
(58) Field of Classification Search .................. 501/77, 501/78, 79; 65/63, 64
See application file for complete search history.

(56) References Cited

U.S. PATENT DOCUMENTS

| 4,128,432 A | 12/1978 | Komorita et al. |
| 4,179,300 A | 12/1979 | Sagara |
| 4,268,312 A | 5/1981 | Ishibashi et al. |
| 4,612,295 A | 9/1986 | Sagara |

(Continued)

FOREIGN PATENT DOCUMENTS

CN 1472154 A 4/2004

(Continued)

OTHER PUBLICATIONS

1991 Data Book of Glass Composition, p. 106, published by Glass Manufacturers' Association of Japan (GMAJ), with English translation.

Primary Examiner—Karl E Group
Assistant Examiner—Elizabeth A Bolden
(74) Attorney, Agent, or Firm—Nixon & Vanderhye P.C.

(57) ABSTRACT

An optical glass having high refractivity and a low sag temperature and having a low-temperature softening property that enables precision press-molding is provided, and the optical glass contains, by mol %, 5 to 50% of $B_2O_3$, 3 to 50% of $SiO_2$, 5 to 40% of $TiO_2$, 1 to 40% of ZnO, 5 to 20% of $La_2O_3$, 0 to 10% of $Gd_2O_3$, 0 to 15% of $Nb_2O_5$, 0 to 10% of $ZrO_2$, 0 to 5% of $Ta_2O_5$, 0 to 10% of $Bi_2O_3$, 0 to 10% of MgO, 0 to 8% of CaO, 0 to 10% of SrO, 0 to 10% of BaO, provided that the total content of MgO, CaO, SrO and BaO is 15% or less, 0 to 20% of $Li_2O$, and 0 to 5% of $Na_2O$, optionally containing $Sb_2O_3$ as a refining agent, and having a refractive index (nd) of 1.8 or more and an Abbe's number (vd) of 35 or less.

9 Claims, 1 Drawing Sheet

U.S. PATENT DOCUMENTS

| | | |
|---|---|---|
| 4,742,028 A | 5/1988 | Boudot et al. |
| 5,288,669 A | 2/1994 | Grateau et al. |
| 6,121,176 A | 9/2000 | Comte |
| 6,187,702 B1 | 2/2001 | Morishita |
| 7,091,145 B2 | 8/2006 | Wolff et al. |
| 7,232,779 B2 | 6/2007 | Kasuga et al. |
| 2003/0022782 A1 | 1/2003 | Uehara |
| 2004/0023787 A1 | 2/2004 | Wolff et al. |
| 2004/0106507 A1 | 6/2004 | Kasuga et al. |
| 2004/0145815 A1 | 7/2004 | Endo |
| 2004/0220041 A1 | 11/2004 | Isowaki et al. |
| 2004/0242397 A1 | 12/2004 | Nakayama |
| 2005/0209085 A1 | 9/2005 | Endo |
| 2007/0049483 A1 | 3/2007 | Hayashi |
| 2008/0194395 A1 | 8/2008 | Endo |

FOREIGN PATENT DOCUMENTS

| | | |
|---|---|---|
| CN | 1495137 A | 5/2004 |
| JP | 49-21408 | 2/1974 |
| JP | 58-125636 | 7/1983 |
| JP | 62-100449 | 5/1987 |
| JP | 2000-159537 | 6/2000 |
| JP | 2001-509126 | 7/2001 |
| JP | 2003-267748 A | 9/2003 |
| JP | 2004-18371 | 1/2004 |
| JP | 2004-99428 | 4/2004 |
| JP | 2004-175592 | 6/2004 |
| JP | 2004-175632 | 6/2004 |
| WO | WO 2004/087596 A1 | 10/2004 |

OPTICAL GLASS, PRECISION PRESS-MOLDING PREFORM, PROCESS FOR PRODUCING THE PREFORM, OPTICAL ELEMENT AND PROCESS FOR PRODUCING THE ELEMENT

CROSS REFERENCE TO RELATED APPLICATION

This application is a divisional of application Ser. No. 11,273,621 filed Nov. 15, 2005, now abandoned which in turn claims priority of Japanese application Ser. No. 2004-330047 filed Nov. 15, 2004, the entire content of which is hereby incorporated by reference in this application.

FIELD OF THE INVENTION

The present invention relates to an optical glass, a precision press-molding preform formed of the above optical glass, a process for producing the preform, an optical element formed of the above optical glass and a process for producing the element.

TECHNICAL BACKGROUND

A high-refractivity low-dispersion glass is briskly in high demand as a material for optical elements such as various lenses. As a glass having such optical properties, there are known a heavy tantalum flint glass TaSF17, and the like, which are described in "Glass Composition Handbook" written by Hiroshi OGAWA and Shinei OGAWA and issued by Japan Glass Product Society, 1991, page 106.

DISCLOSURE OF THE INVENTION

In recent years, with rapid widespread use of digital cameras, video cameras and the like, glass lenses as parts therefor are much in demand. On the other hand, with an increase in the pixels of the cameras, optical elements such as glass lenses are required to have high performances, and it is required to produce optical elements formed of a glass having high form accuracy highly productively.

A precision press-molding method is known as a method for highly productively producing optical elements formed of a glass having high form accuracy. Any one of conventional glasses such as TaSF17 has a high glass transition temperature, and they are hence not suitable for precision press-molding.

Overcoming the problems of the above conventional glasses, the first object of the present invention is to provide an optical glass that has a high refractive index and that has a low sag temperature and a low-temperature softening property enabling precision press-molding.

Further, the second and third objects of the present invention are to provide a precision press-molding formed of the optical glass that achieves the above object and to provide a process for producing such a precision press-molding preform.

Furthermore, the fourth and fifth objects of the present invention are to provide an optical element formed of the optical glass that achieves the above object and a process for producing such an optical element.

The present inventors have made diligent studies and as a result have found that the above objects can be achieved by an optical glass comprising $B_2O_3$, $SiO_2$, $TiO_2$, ZnO and $La_2O_3$ which are co-present as essential components and having contents of these essential components and other optional components in predetermined ranges, and the present invention has been accordingly completed.

That is, the present invention provides (1) an optical glass comprising, by mol %,
5 to 50% of $B_2O_3$,
3 to 50% of $SiO_2$,
5 to 40% of $TiO_2$,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO,
0 to 8% of CaO,
0 to 10% of SrO,
0 to 10% of BaO
provided that the total content of MgO, CaO, SrO and BaO is 15% or less,
0 to 20% of $Li_2O$, and
0 to 5% of $Na_2O$,
optionally containing $Sb_2O_3$ as a refining agent, and having a refractive index (nd) of 1.8 or more and an Abbe's number (vd) of 35 or less (to be referred to as "glass 1" hereinafter), (2) an optical glass comprising, by mol %,
5 to 50% of $B_2O_3$,
3 to 50% of $SiO_2$,
5 to 40% of $TiO_2$,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO,
0 to 8% of CaO,
0 to 10% of SrO,
0 to 10% of BaO, the content of BaO being less than 13% by weight,
provided that the total content of MgO, CaO, SrO and BaO is 15% by weight or less,
0 to 20% of $Li_2O$,
0 to 5% of $Na_2O$,
0 to 1% of $Sb_2O_3$,
and having a refractive index (nd) of over 1.88 and an Abbe's number (vd) of 35 or less (to be referred to as "glass 2" hereinafter), (3) an optical glass comprising, by mol %,
5 to 50% of $B_2O_3$,
3 to 50% of $SiO_2$,
5 to 40% of $TiO_2$,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO,
0 to 8% of CaO,
0 to 10% of SrO,
0 to 10% of BaO,
provided that the total content of MgO, CaO, SrO and BaO is less than 6% by weight, 0 to 20% of $Li_2O$,
0 to 5% of $Na_2O$, and
0 to 1% of $Sb_2O_3$, the amount of $Sb_2O_3$ being 1% by weight or less, and having a refractive index of 1.8 or more and an Abbe's number (vd) of 35 or less (to be referred to as "glass 2" hereinafter), (4) an optical glass comprising, by mol %,
25 to 50% of $B_2O_3$, the content of $B_2O_3$ being over 15% by weight,
3 to 50% of $SiO_2$,
5 to 40% of $TiO_2$,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO,
0 to 8% of CaO,
0 to 10% of SrO,
0 to 10% of BaO, the content of BaO being less than 13% by weight,
provided that the total content of MgO, CaO, SrO and BaO is less than 15% by weight,
0 to 20% of $Li_2O$,
0 to 5% of $Na_2O$, and
0 to 1% of $Sb_2O_3$, the amount of $Sb_2O_3$ being 1% by weight or less, and having a refractive index (nd) of 1.8 or more and an Abbe's number (vd) of 35 or less (to be referred to as "glass 4" hereinafter), (5) an optical glass comprising, by mol %,
5 to 50% of $B_2O_3$,
3 to 50% of $SiO_2$,
5 to 40% of $TiO_2$,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO,
0 to 8% of CaO,
0 to 10% of SrO,
0 to 10% of BaO, the content of BaO being less than 13% by weight,
provided that the total content of MgO, CaO, SrO and BaO is less than 15% by weight,
2 to 20% of $Li_2O$, the content of $Li_2O$ being over 2% by weight,
0 to 5% of $Na_2O$, and
0 to 1% of $Sb_2O_3$, the amount of $Sb_2O_3$ being 1% by weight or less, and having a refractive index (nd) of 1.8 or more and an Abbe's number (vd) of 35 or less (to be referred to as "glass 5" hereinafter), (6) an optical glass comprising, by mol %,
25 to 50% of $B_2O_3$, the content of $B_2O_3$ being over 17% by weight,
3 to 50% of $SiO_2$,
5 to 40% of $TiO_2$,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO,
0 to 8% of CaO,
0 to 10% of SrO,
0 to 10% of BaO, the content of BaO being less than 13% by weight,
2 to 20% of $Li_2O$, the content of $Li_2O$ being over 2% by weight,
0 to 5% of $Na_2O$, and
0 to 1% of $Sb_2O_3$, the amount of $Sb_2O_3$ being 1% by weight or less, and having a refractive index (nd) of 1.8 or more and an Abbe's number (vd) of 35 or less (to be referred to as "glass 6" hereinafter), (7) an optical glass comprising, by mol %,
5 to 50% of $B_2O_3$,
3 to 50% of $SiO_2$,
12 to 40% of $TiO_2$, the content of $TiO_2$ being over 12% by weight but not more than 30% by weight,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO,
0 to 8% of CaO,
0 to 10% of SrO,
0 to 10% of BaO, the content of BaO being less than 13% by weight,
provided that the total content of MgO, CaO, SrO and BaO is less than 6% by weight,
0 to 20% of $Li_2O$,
0 to 5% of $Na_2O$, and
0 to 1% of $Sb_2O_3$, the amount of $Sb_2O_3$ being less than 1% by weight, and having a refractive index (nd) of 1.8 or more and an Abbe's number (vd) of 35 or less (to be referred to as "glass 7" hereinafter), (8) an optical glass comprising, by mol %,
5 to 50% of $B_2O_3$,
3 to 20% of $SiO_2$, the content of $SiO_2$ being less than 8% by weight,
5 to 40% of $TiO_2$,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO,
0 to 8% of CaO,
0 to 10% of SrO,
0 to 10% of BaO, the content of BaO being less than 13% by weight,
2 to 20% of $Li_2O$, the content of $Li_2O$ being over 2% by weight,
0 to 5% of $Na_2O$, and 0 to 1% of $Sb_2O_3$, the amount of $Sb_2O_3$ being 1% by weight or less, and having a refractive index (nd) of 1.8 or more and an Abbe's number (vd) of 35 or less (to be referred to as "glass 8" hereinafter), (9) an optical glass comprising, by mol %,
5 to 50% of $B_2O_3$,
3 to 20% of $SiO_2$, the content of $SiO_2$ being less than 8% by weight,
5 to 40% of $TiO_2$,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO,
0 to 8% of CaO,
0 to 10% of SrO,
0 to 10% of BaO, the content of BaO being less than 13% by weight,
0 to 20% of $Li_2O$,
0 to 5% of $Na_2O$, and
0 to 1% of $Sb_2O_3$, and having a refractive index (nd) of over 1.88 and an Abbe's number (vd) of 35 or less (to be referred to as "glass 9" hereinafter),

(10) the optical glass of any one of the above (1), (2), (3), (4), (7) and (9), which contains 1 to 20 mol % of $Li_2O$,

(11) the optical glass of any one of the above (1), (3), (4), (5), (6), (7) and (8), which contains over 27% by weight of $La_2O_3$,

(12) the optical glass of any one of the above (1), (3), (4), (5), (6), (7) and (8), which contains 16% by weight or less of $TiO_2$,

(13) the optical glass of any one of the above (1), (3), (4) and (7), which contains over 27% by weight of $La_2O_3$ and 1 to 20 mol % of $Li_2O$,

(14) the optical glass of any one of the above (1) to (12), wherein the content of CaO is less than 5% by weight,

(15) the optical glass of any one of the above (1) to (13), which has a sag temperature of 670° C. or lower,

(16) the optical glass of any one of the above (1) to (14), which is for use in precision press-molding,

(17) a precision press-molding preform formed of the optical glass of the above (15),

(18) a process for producing a precision press-molding preform formed of a glass, which comprises separating a molten glass from a flowing glass and shaping the molten glass into a preform during cooling of the molten glass,
wherein said glass is the optical glass of the above (15),

(19) an optical element formed of the optical glass of any one of the above (1) to (15),

(20) a process for producing an optical element, which comprises heating a precision press-molding preform formed of a glass and precision press-molding the preform with a press mold,
wherein the preform of the above (17) is used as the precision press-molding preform,

(21) a process for producing an optical element, which comprises heating a precision press-molding preform formed of a glass and precision press-molding the preform with a press mold,
wherein a preform produced by the process of the above (18) is used as the precision press-molding preform,

(22) the process for producing an optical element as recited in the above (20) or (21), wherein the press mold and the preform are heated together to precision press-mold the preform with the press mold, and

(23) the process for producing an optical element as recited in the above (20) or (21), wherein the press mold is pre-heated, and the preform is pre-heated separately from the press mold and introduced into the pre-heated press mold to precision press-mold the preform with the press mold.

Effect of the Invention

According to the present invention, there can be obtained an optical glass having a high refractive index and a low sag temperature and having a low-temperature softening property that enables precision press-molding, and there can be obtained a precision press-molding preform formed of the above optical glass and an optical element formed of the above optical glass.

PREFERRED EMBODIMENTS OF THE INVENTION

Optical Glass

Figure 1:
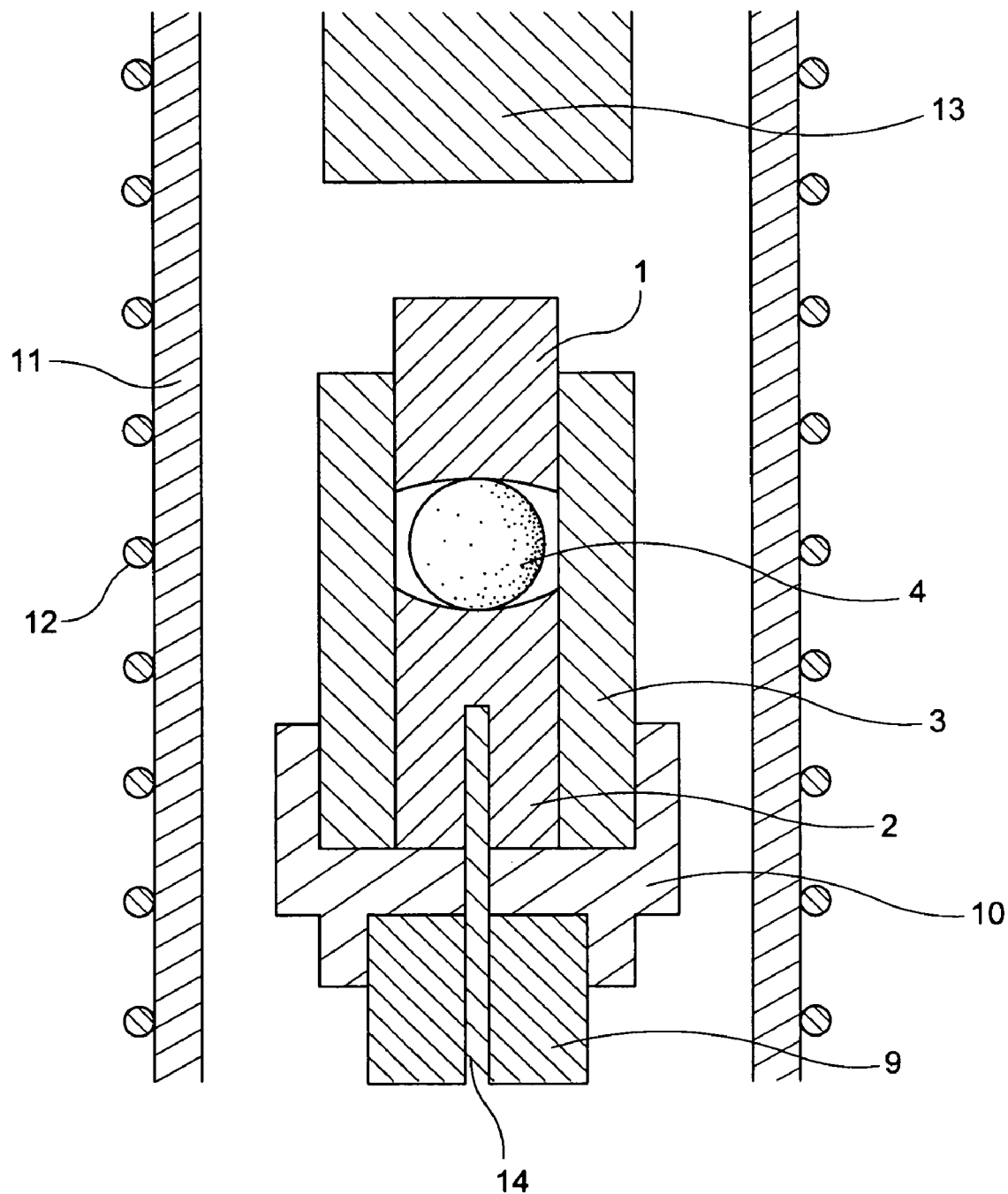
FIG. 1 is a schematic drawing of a precision press-molding apparatus used in Example.

The optical glass of the present invention will be explained first.

The optical glass of the present invention is a high-refractivity glass having a refractive index (nd) of 1.8 or more and an Abbe's number (vd) of 35 or less, and has a low-temperature softening property suitable for precision press-molding. Further, when a glass preform for precision press-molding is shaped directly from a molten glass thereof, the optical glass of the present invention does not easily undergo crystallization and has excellent glass stability.

For realizing the above various properties, the optical glass of the present invention contains $B_2O_3$ and $SiO_2$ as essential components for forming a glass network, contains $TiO_2$ and $La_2O_3$ as essential components for increasing the refractive index and contains ZnO as an essential component for imparting the optical glass with the low-temperature softening property while maintaining the high refractivity. The optical glass of the present invention has the above $B_2O_3$—$SiO_2$—$TiO_2$—ZnO—$La_2O_3$ composition system, in which the contents of alkaline earth metal oxides such as MgO, CaO, SrO and BaO are limited and the contents of divalent components (MgO, CaO, SrO, BaO, ZnO, etc.) are arranged to be occupied by the content of ZnO, and are preferably arranged to be occupied by the contents of ZnO and $Li_2O$.

Glass components for constituting the glasses 1 to 9 included in the optical glass of the present invention will be explained in detail below. Percents (%) for the content of each component and each of total contents thereof will stand for mol % unless otherwise specified.

$B_2O_3$ is an essential component for the glass network of the optical glass. When it is introduced to excess, the refractive index (nd) is decreased.

Therefore, in the glasses 1 to 3, 5 and 7 to 9, the content of $B_2O_3$ is 5 to 50%, preferably 10 to 40%, more preferably 10 to 38%. In the glasses 4 and 6, the content of $B_2O_3$ is 25 to 50% (however, the content thereof in the glass 4 is adjusted such that it is over 15% by weight, and the content thereof in the glass 6 is adjusted such that it is over 17% by weight).

$SiO_2$ is an essential component that works to improve the optical glass in stability. When it is introduced to excess, the refractive index is decreased, and the sag temperature is increased. Therefore, the content of $SiO_2$ in the glasses 1 to 7 is 3 to 50%, preferably 5 to 20%, more preferably 5 to 18%, and the content of $SiO_2$ in the glasses 8 and 9 is 3 to 20% (however, the content thereof is adjusted such that it is less than 8% by weight).

In addition, one of the objects of the optical glass of the present invention is to have a low-temperature softening property suitable for precision press-molding, and the effect of $B_2O_3$ is superior to the effect of $SiO_2$ in this regard, so that it is preferred to adjust the contents of $B_2O_3$ and $SiO_2$ by weight ratio such that the content of $B_2O_3$ is larger than the content of $SiO_2$. It is more preferred to adjust the weight ratio of the $B_2O_3$ content/$SiO_2$ content to 1.2 or more, and it is still more preferred to adjust the above weight ratio to 1.3 or more. The above property is common to the glasses 1 to 9 included in the optical glass of the present invention. $B_2O_3$ and $SiO_2$ are introduced so as to satisfy the above relationship, and in this case, there can be also obtained a glass that is less colored and that has high light transmissivity in the visible light region.

$TiO_2$ is an essential component for increasing the refractive index. When it is introduced to excess, however, the optical glass is degraded in stability and is colored. Therefore, the content of $TiO_2$ in the glasses 1 to 6, 8 and 9 is 5 to 40%, preferably 10 to 40%, more preferably 10 to 35%, still more preferably 10 to 32%. The content of $TiO_2$ in the glass 7 is 12 to 40% (however, the content thereof is adjusted such that it is over 12% by weight but not more than 30% by weight). Further, the content of $TiO_2$ in the glasses 1 and 3 to 8 is preferably 16% by weight or less.

ZnO is introduced such that the content thereof is 1% or more, for imparting the optical glass with the low-temperature softening property while maintaining the high refractivity. When it is introduced to excess, the optical glass is degraded in stability, so that the content of ZnO is limited to 40% or less. The content of ZnO is preferably 3 to 35%, more preferably 5 to 32%.

$La_2O_3$ is introduced such that the content thereof is 5% or more, for imparting the optical glass with the high-refractivity and low-dispersion properties. When it is introduced to excess, the optical glass is degraded in stability, so that the content of $La_2O_3$ is limited to 20% or less. The content of $La_2O_3$ is preferably 5 to 18%, more preferably 5 to 17%. $La_2O_3$ is relatively a component that increases the refractive index without coloring the optical glass. For obtaining an optical glass having a refractive index (nd) of 1.8 or more, or the glasses 1 and 3 to 8 in particular, therefore, the content thereof is preferably adjusted such that it is over 27% by weight, and it is more preferably adjusted to 30% by weight or more.

$Gd_2O_3$ is an optional component for imparting the optical glass with high-refractivity low-dispersion properties. When it is introduced to excess, the optical glass is degraded in stability, so that the content of $Gd_2O_3$ is limited to 0 to 10%. The content of $Gd_2O_3$ is preferably 0 to 8%, more preferably 0.5 to 5%.

$Nb_2O_5$ is an optional component for increasing the refractive index. When it is introduced to excess, the optical glass is degraded in stability, and the liquidus temperature is increased, so that the content of $Nb_2O_5$ is limited to 0 to 15%. The content of $Nb_2O_5$ is preferably 1 to 10%, more preferably 1 to 8%.

$ZrO_2$ is an optional component that works to increase the refractive index. However, when it is introduced to excess, the optical glass is degraded in stability, and the liquidus temperature is increased, so that the content of $ZrO_2$ is limited to 0 to 10%. The content of $ZrO_2$ is preferably 1 to 8%, more preferably 1 to 5%.

$Ta_2O_5$ is an optional component that increases the refractive index. However, when it is introduced to excess, the optical glass is degraded in stability, so that the content of $Ta_2O_5$ is limited to 0 to 5%. The content of $Ta_2O_5$ is preferably 0 to 4%, more preferably 0 to 3%.

$Bi_2O_3$ is an optional component that increases the refractive index and improves the optical glass in stability. However, when it is introduced to excess, the optical glass is colored, so that the content of $Bi_2O_3$ is limited to 0 to 10%. The content of $Bi_2O_3$ is preferably 0 to 6%, more preferably 0 to 4%.

MgO is an optional component that works to improve the glass in meltability. However, when it is introduced to excess, the glass is degraded in refractivity and stability, so that the content of MgO is limited to 0 to 10%. The content of MgO is preferably 0 to 8%, more preferably 0 to 6%.

CaO works to improve the glass in meltability and is an optional component for adjusting optical constants. However, when it is introduced to excess, the optical glass is degraded in refractivity and stability, so that the content of CaO is limited to 0 to 8%. The content of CaO is preferably less than 5% by weight, more preferably 4% by weight or less, still more preferably 0 to 6%.

SrO is an optional component that works to improve the optical glass in meltability. However, when it is introduced to excess, the optical glass is degraded in refractivity and stability, so that the content of SrO is limited to 0 to 10%. The content of SrO is preferably 0 to 8%, more preferably 0 to 6%.

BaO is an optional component that works to increase the refractive index. However, when it is introduced to excess, the optical glass is degraded in stability, so that the content of BaO is limited to 0 to 10%. The content of BaO is preferably 1 to 8%, more preferably 1 to 6%. In the glasses 2 and 4 to 9, the content of BaO is limited to less than 13% by weight.

The total content of MgO, CaO, SrO and BaO in the glass 1 is limited to 15% or less, the above total content in each of the glasses 2, 4 and 5 is limited to less than 15% by weight, and the above total content in each of the glasses 3 and 7 is limited to less than 6% by weight. These conditions are imposed on the optical glass for the following reason. The total content to divalent components such as the above alkaline earth metal oxides and ZnO is limited, and of these divalent components, ZnO alone works to decrease the sag temperature of the optical glass. Although the total content is limited, therefore, a necessary amount of ZnO is to be secured for maintaining or improving the stability of the optical glass. In addition, in the glasses 1, 6, 8 and 9, the total content of MgO, CaO, SrO and BaO is also preferably limited to less than 15% by weight, more preferably, to 14% by weight or less.

$Li_2O$ is a component that highly effectively decreases the glass transition temperature. However, when it is introduced to excess, not only the refractive index is decreased, but also the optical glass is degraded in stability. Therefore, the content of $Li_2O$ in each of the glasses 1 to 4, 7 and 9 is limited to 0 to 20%, preferably, to 1 to 20%, more preferably, to 2 to 20%, still more preferably 4 to 15%, and the content in each of the glasses 5, 6 and 8 is limited to 2 to 20% (however, the content of $Li_2O$ is adjusted such that it is over 2% by weight). Further, in the glasses 1, 3, 4 and 7, preferably, the content of $La_2O_3$ is adjusted such that it is over 27% by weight, and the content of $Li_2O$ is adjusted to 1 to 20%.

$Na_2O$ is a component that works to improve the optical glass in meltability. However, when it is introduced to excess, the optical glass is degraded in refractivity and stability, so that the content of $Na_2O$ is limited to 0 to 5%. The content of $Na_2O$ is preferably 0 to 4%, more preferably 0 to 3%.

Alkali metal oxides such as $Li_2O$, $Na_2O$, $K_2O$, etc., all work to improve the optical glass in meltability. However, $Li_2O$, $Na_2O$ and $K_2O$ greatly differ in the effect on the decreasing of the glass transition temperature, and the above effect is the greatest when $Li_2O$ is introduced. In addition to these, ZnO is also a component that has an effect on the decreasing of the glass transition temperature as well. Both ZnO and $Li_2O$ improve the low-temperature softening property without decreasing the refractive index. In the optical glass of the present invention, therefore, the method of introducing ZnO and the alkali metal oxides can be largely classified into two types.

In the first type, a decrease in the glass transition temperature is attained mainly by ZnO, and the total content of $Li_2O$, $Na_2O$ and $K_2O$ is suppressed. The above total content ($Li_2O+Na_2O+K_2O$) is preferably less than 1.5% by weight, more preferably 1% by weight or less. It can be said that the first type constitutes preferred embodiments of the glasses 1, 2, 3, 4, 7 and 9.

In the second type, ZnO is used as an essential component and the content of $Li_2O$ is adjusted such that it is the largest among the alkali metal oxides. An optical glass in which the content of $Li_2O$ is greater than each of the content of $Na_2O$ and the content of $K_2O$ in terms of weight ratio is preferred, and an optical glass in which the content of $Li_2O$ is greater than the total content of $Na_2O$ and $K_2O$ in terms of weight ratio is more preferred. It can be said that the second type constitutes preferred embodiments of the glasses 1, 2, 3, 4, 7 and 9 that contain $Li_2O$ (those in which the content of $Li_2O$ is over 0% in terms of both weight percent and mol %) and the glasses 5, 6 and 8.

$Sb_2O_3$ is a refining agent that can be added as required. In the glasses 2 to 9, the amount of $Sb_2O_3$ is 0 to 1%. In the glasses 3 to 8, the amount of $Sb_2O_3$ is limited to 1% by weight or less for preventing damage caused on the molding surface of a press mold by oxidation during precision press-molding. In the glasses 1, 2 and 9, it is as well preferred to limit the amount of $Sb_2O_3$ to 1% by weight or less.

For attaining more preferable properties with regard to various properties of the above optical glass, it is preferred to adjust the total amount of the total content of the above glass components and the amount of $Sb_2O_3$ to at least 98%, it is more preferred to adjust the above total amount such that it is over 99%, and it is still more preferred to adjust the above total amount to 100%.

In the optical glass of the present invention, $WO_3$ is one of components whose introduction is undesirable. That is because it is considered that the introduction of $WO_3$ degrades the optical glass in stability.

Further, it is also desirable not to introduce components that cause environmentally detrimental effects such as PbO and $As_2O_3$ into the optical glass of the present invention. These components are also undesirable for precision press-molding. In a glass containing PbO, PbO on the glass surface is reduced in a non-oxidizing atmosphere (particularly, a reducing atmosphere containing a reducing gas such as hydrogen, or the like) during precision press-molding to be precipitated on the glass surface, and the precipitate adheres to a press mold to cause the surface accuracy of a precision press-molded product to decrease. $As_2O_3$ oxidizes the molding surface of a press mold to cause the molding surface to be damaged.

Further, except for a case where the optical glass is imparted with the function to absorb light in a specific wavelength region by coloring it, it is desirable not to introduce components such as Cu, Fe, Cd, Cr, Ni, Co, and the like.

F can be introduced so long as its amount is small. However, when a precision press-molding is shaped directly from a molten glass, F is volatilized from the glass surface to cause defects such as striae, etc., or to cause a variation in optical properties such as a refractive index, etc., in some cases so that non-introduction of F is preferred.

Compositions of the glasses 1 to 9 included in the optical glass of the present invention will be explained below.

(Glass 1)

The glass 1 is an optical glass comprising, by mol %, 5 to 50% of $B_2O_3$,
3 to 50% of $SiO_2$,
5 to 40% of $TiO_2$,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO,
0 to 8% of CaO,
0 to 10% of SrO,
0 to 10% of BaO provided that the total content of MgO, CaO, SrO and BaO is 15% or less, 0 to 20% of $Li_2O$, and
0 to 5% of $Na_2O$, optionally containing $Sb_2O_3$ as a refining agent, and having a refractive index (nd) of 1.8 or more and an Abbe's number (vd) of 35 or less.

In the glass 1, the contents of divalent components such as MgO, CaO, SrO, BaO and ZnO are brought into ranges where the glass stability is maintained, and the contents of the divalent components are arranged to be occupied mainly by ZnO that greatly contributes to an improvement in the low-temperature softening property. Therefore, the total content of MgO, CaO, SrO and BaO is limited to 15% or less, preferably, to 13% or less, and the contents of MgO and CaO which do not contribute to high refractivity among the alkaline earth metal oxides are limited to 10% or less and 8% or less, respectively. A proper amount of $Sb_2O_3$ is incorporated into the above glass composition not as a glass component but as a refining agent. The amount of $Sb_2O_3$ can be 1% or less as a standard amount, and the amount of $Sb_2O_3$ is preferably 0 to 1% by weight.

(Glass 2)

The glass 2 is an optical glass comprising, by mol %, 5 to 50% of $B_2O_3$,
3 to 50% of $SiO_2$,
5 to 40% of $TiO_2$,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO, 0 to 8% of CaO,
0 to 10% of SrO,
0 to 10% of BaO, the content of BaO being less than 13% by weight,
provided that the total content of MgO, CaO, SrO and BaO is 15% by weight or less,
0 to 20% of $Li_2O$,
0 to 5% of $Na_2O$, to 1% of $Sb_2O_3$, and having a refractive index (nd) of over 1.88 and an Abbe's number (vd) of 35 or less.

In the glass 2, the total content of MgO, CaO, SrO and BaO is as well limited to less than 15% by weight, preferably to 14% by weight or less, and the contents of MgO and CaO are limited to 10% or less and 8% or less, respectively, for realizing a high-refractivity glass having a refractive index (nd) of over 1.88, preferably 1.89 or more, while maintaining the glass stability and imparting the glass with the low-temperature softening property. BaO is a component that contributes to higher refractivity among the alkaline earth metal oxides. However, for realizing the low-temperature softening property while maintaining the glass stability, the content of BaO is limited to less than 13% by weight, and the content of BaO is preferably 12.5% by weight or less, more preferably 12% by weight or less.

(Glass 3)

The glass 3 is an optical glass comprising, by mol %,
5 to 50% of $B_2O_3$,
3 to 50% of $SiO_2$,
5 to 40% of $TiO_2$,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO,
0 to 8% of CaO,
0 to 10% of SrO,
0 to 10% of BaO,
provided that the total content of MgO, CaO, SrO and BaO is less than 6% by weight,
0 to 20% of $Li_2O$,
0 to 5% of $Na_2O$, and
0 to 1% of $Sb_2O_3$, the amount of $Sb_2O_3$ being 1% by weight or less, and having a refractive index of 1.8 or more and an Abbe's number (vd) of 35 or less.

In the glass 3, the total content of MgO, CaO, SrO and BaO is as well limited to less than 6% by weight, preferably 5% by weight or less, and the contents of MgO and CaO are also limited to 10% or less and 8% or less, respectively, for realizing a high-refractivity glass having a refractive index (nd) of 1.8 or more while maintaining the glass stability and imparting the glass with the low-temperature softening property. Further, the amount of $Sb_2O_3$ which is optionally added as a refining agent is limited to 1% by weight or less for preventing damage on the molding surface of a press mold by oxidation during precision press-molding.

(Glass 4)

The glass 4 is an optical glass comprising, by mol %,
25 to 50% of $B_2O_3$, the content of $B_2O_3$ being over 15% by weight,
3 to 50% of $SiO_2$,
5 to 40% of $TiO_2$,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO,
0 to 8% of CaO,
0 to 10% of SrO,
0 to 10% of BaO, the content of BaO being less than 13% by weight,
provided that the total content of MgO, CaO, SrO and BaO is less than 15% by weight,
0 to 20% of $Li_2O$,
0 to 5% of $Na_2O$, and
0 to 1% of $Sb_2O_3$, the amount of $Sb_2O_3$ being 1% by weight or less, and having a refractive index (nd) of 1.8 or more and an Abbe's number (vd) of 35 or less.

In the glass 4, the content of $B_2O_3$ as a network-forming component is limited to 25 to 50% (however, the content thereof is over 15% by weight) for improving the glass in stability. The content of $B_2O_3$ is preferably 28 to 50% (however, the content thereof is 15.5% by weight or more), more preferably 30 to 47% (however, the content thereof is 16% by weight or more). The upper limit of the content of $B_2O_3$ is particularly preferably 40%. Further, for realizing a high-refractivity glass maintaining glass stability, having the low-temperature softening property and a refractive index (nd) of 1.8 or more, the total content of MgO, CaO, SrO and BaO is limited to less than 15% by weight, preferably to 14% by weight or less, the content of MgO is limited to 10% or less, the content of CaO is limited to 8% or less, and ZnO is used as an essential component. BaO is a component that contributes to higher refractivity among the alkaline earth metal oxides. However, for realizing the low-temperature softening property while maintaining the glass stability, the content of BaO is limited to less than 13% by weight, and the content of BaO is preferably 12.5% by weight or less, more preferably 12% by weight or less. Further, the amount of $Sb_2O_3$ which is optionally added as a refining agent is limited to 1% by weight or less for preventing damage on the molding surface of a press mold by oxidation during precision press-molding.

(Glass 5)

The glass 5 is an optical glass comprising, by mol %,
5 to 50% of $B_2O_3$,
3 to 50% of $SiO_2$,
5 to 40% of $TiO_2$,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO,
0 to 8% of CaO,
0 to 10% of SrO,
0 to 10% of BaO, the content of BaO being less than 13% by weight,
provided that the total content of MgO, CaO, SrO and BaO is less than 15% by weight,
2 to 20% of $Li_2O$, the content of $Li_2O$ being over 2% by weight,
0 to 5% of $Na_2O$, and
0 to 1% of $Sb_2O_3$, the amount of $Sb_2O_3$ being 1% by weight or less, and having a refractive index (nd) of 1.8 or more and an Abbe's number (vd) of 35 or less.

In the glass 5, for realizing a high-refractivity glass maintaining glass stability, having the low-temperature softening property and a refractive index (nd) of 1.8 or more, the total content of MgO, CaO, SrO and BaO is as well limited to less than 15% by weight, preferably to 14% by weight or less, and the contents of MgO and CaO are limited to 10% or less and 8% or less, respectively. BaO is a component that contributes to higher refractivity among the alkaline earth metal oxides. However, for realizing the low-temperature softening property while maintaining the glass stability, the content of BaO is limited to less than 13% by weight, and the content of BaO is preferably 12.5% by weight or less, more preferably 12% by weight or less. In the glass 5, 2 to 20% (however, over 2% by weight) of $Li_2O$ is introduced from the point of view of realizing a glass more suitable for precision press-molding by decreasing the sag temperature of the glass while maintaining high refractivity. Further, the amount of $Sb_2O_3$ which is optionally added as a refining agent is limited to 1% by weight or less for preventing damage on the molding surface of a press mold by oxidation during precision press-molding.

(Glass 6)

The glass 6 is an optical glass comprising, by mol %, 25 to 50% of $B_2O_3$, the content of $B_2O_3$ being over 17% by weight, 3 to 50% of $SiO_2$, 5 to 40% of $TiO_2$, 1 to 40% of ZnO, 5 to 20% of $La_2O_3$, 0 to 10% of $Gd_2O_3$, 0 to 15% of $Nb_2O_5$, 0 to 10% of $ZrO_2$, 0 to 5% of $Ta_2O_5$, 0 to 10% of $Bi_2O_3$, 0 to 10% of MgO, 0 to 8% of CaO, 0 to 10% of SrO, 0 to 10% of BaO, the content of BaO being less than 13% by weight, 2 to 20% of $Li_2O$, the content of $Li_2O$ being over 2% by weight, 0 to 5% of $Na_2O$, and 0 to 1% of $Sb_2O_3$, the amount of $Sb_2O_3$ being 1% by weight or less, and having a refractive index (nd) of 1.8 or more and an Abbe's number (vd) of 35 or less.

In the glass 6, the content of $B_2O_3$ as a network-forming component is limited to 25 to 50% (however, over 17% by weight) for improving the glass in stability. The content of $B_2O_3$ is preferably 28 to 50% (however, the content thereof of is 17.5% by weight or more), more preferably 30 to 50% (however, the content thereof is 18% by weight or more). The upper limit of the content of $B_2O_3$ is particularly preferably 40%. Further, for realizing a high-refractivity glass having a refractive index (nd) of 1.8 or more while maintaining the glass stability and imparting the glass with the low-temperature softening property, the contents of MgO and CaO are limited to 10% or less and 8% or less, respectively, and ZnO is used as an essential component. BaO is a component that contributes to higher refractivity among the alkaline earth metal oxides. However, for realizing the low-temperature softening property while maintaining the glass stability, the content of BaO is limited to less than 13% by weight, and the content of BaO is preferably 12.5% by weight or less, more preferably 12% by weight or less. From the point of view of realizing a glass more suitable for precision press-molding by decreasing the sag temperature of the glass while maintaining high refractivity, 2 to 20% (however, over 2% by weight) of $Li_2O$ is introduced, and preferably, 2.5% by weight or more of $Li_2O$ is introduced. Further, the amount of $Sb_2O_3$ which is optionally added as a refining agent is limited to 1% by weight or less for preventing damage on the molding surface of a press mold by oxidation during precision press-molding.

(Glass 7)

The glass 7 is an optical glass comprising, by mol %, 5 to 50% of $B_2O_3$, 3 to 50% of $SiO_2$, 12 to 40% of $TiO_2$, the content of $TiO_2$ being over 12% by weight but not more than 30% by weight, 1 to 40% of ZnO, 5 to 20% of $La_2O_3$, 0 to 10% of $Gd_2O_3$, 0 to 15% of $Nb_2O_5$, 0 to 10% of $ZrO_2$, 0 to 5% of $Ta_2O_5$, 0 to 10% of $Bi_2O_3$, 0 to 10% of MgO, 0 to 8% of CaO, 0 to 10% of SrO, 0 to 10% of BaO, the content of BaO being less than 13% by weight, provided that the total content of MgO, CaO, SrO and BaO is less than 6% by weight, 0 to 20% of $Li_2O$, 0 to 5% of $Na_2O$, and 0 to 1% of $Sb_2O_3$, the amount of $Sb_2O_3$ being less than 1% by weight, and having a refractive index (nd) of 1.8 or more and an Abbe's number (vd) of 35 or less.

In the glass 7, the content of $TiO_2$ as a component for increasing the refractive index is limited to 12 to 40% (however, the content thereof is limited to over 12% by weight but not more than 30% by weight), preferably, to 12.5% by weight or more but not more than 30% by weight, more preferably, to 13% by weight or more but not more than 30% by weight. The lower limit of the content of $TiO_2$ by mol % is preferably 12%. Further, for realizing a high-refractivity glass having a refractive index (nd) of 1.8 or more while maintaining the glass stability and imparting the glass with the low-temperature softening property, the total content of MgO, CaO, SrO and BaO is limited to less than 6% by weight, preferably, to 5.5% by weight or less, the contents of MgO and CaO are limited to 10% or less and 8% or less, respectively, and ZnO is used as an essential component. BaO is a component that contributes to higher refractivity among the alkaline earth metal oxides. However, for realizing the low-temperature softening property while maintaining the glass stability, the content of BaO is limited to less than 13% by weight, and the content of BaO is preferably 12.5% by weight or less, more preferably 12% by weight or less. From the point of view of realizing a glass more suitable for precision press-molding by decreasing the sag temperature of the glass while maintaining high refractivity, 2 to 20% (however, over 2% by weight) of $Li_2O$ is introduced. Further, the amount of $Sb_2O_3$ which is optionally added as a refining agent is limited to 1% by weight or less for preventing damage on the molding surface of a press mold by oxidation during precision press-molding.

[Glass 8]

The glass 8 is an optical glass comprising, by mol %,
5 to 50% of $B_2O_3$,
3 to 20% of $SiO_2$, the content of $SiO_2$ being less than 8% by weight,
5 to 40% of $TiO_2$,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO,
0 to 8% of CaO,
0 to 10% of SrO,
0 to 10% of BaO, the content of BaO being less than 13% by weight,
2 to 20% of $Li_2O$, the content of $Li_2O$ being over 2% by weight,
0 to 5% of $Na_2O$, and
0 to 1% of $Sb_2O_3$, the content of $Sb_2O_3$ being 1% by weight or less, and having a refractive index (nd) of 1.8 or more and an Abbe's number (vd) of 35 or less.

In the glass 8, the content of $SiO_2$ is adjusted to 3 to 20% (however, the content thereof is less than 8% by weight) for increasing the refractive index. However, the content of $SiO_2$ is preferably 3 to 18% (however, the content thereof is 7.5% by weight or less), more preferably 5 to 16% (however, the content thereof is 7% by weight or less). Further, for realizing a high-refractivity glass having a refractive index (nd) of 1.8 or more while maintaining the glass stability and imparting the glass with the low-temperature softening property, the contents of MgO and CaO are limited to 10% or less and 8% or less, respectively, and ZnO is used as an essential component. BaO is a component that contributes to higher refractivity among the alkaline earth metal oxides. However, for realizing the low-temperature softening property while maintaining the glass stability, the content of BaO is limited to less than 13% by weight, and the content of BaO is preferably 12.5% by weight or less, more preferably 12% by weight or less. From the point of view of realizing a glass more suitable for precision press-molding by decreasing the sag temperature of the glass while maintaining high refractivity, 2 to 20% (however, over 2% by weight) of $Li_2O$ is introduced. Further, the amount of $Sb_2O_3$ which is optionally added as a refining agent is limited to 1% by weight or less for preventing damage on the molding surface of a press mold by oxidation during precision press-molding.

(Glass 9)

The glass 9 is an optical glass comprising, by mol %,
5 to 50% of $B_2O_3$,
3 to 20% of $SiO_2$, the content of $SiO_2$ being less than 8% by weight,
5 to 40% of $TiO_2$,
1 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 10% of MgO,
0 to 8% of CaO,
0 to 10% of SrO,
0 to 10% of BaO, the content of BaO being less than 13% by weight,
0 to 20% of $Li_2O$,
0 to 5% of $Na_2O$, and
0 to 1% of $Sb_2O_3$, and having a refractive index (nd) of over 1.88 and an Abbe's number (vd) of 35 or less.

In the glass 9, for realizing a high-refractivity glass having a refractive index (nd) of over 1.88, preferably 1.89 or more, the content of $SiO_2$ is adjusted to 3 to 20% (however, the content thereof is less than 8% by weight), and the content of $SiO_2$ is preferably 3 to 18% (however, the content thereof is 7.5% by weight or less), more preferably 5 to 16%. The lower limit of the content of $SiO_2$ is preferably 5%. Further, for maintaining the glass stability and imparting the glass with the low-temperature softening property, the contents of MgO and CaO are limited to 10% or less and 8% or less, respectively. BaO is a component that contributes to higher refractivity among the alkaline earth metal oxides. However, for realizing the low-temperature softening property while maintaining the glass stability, the content of BaO is limited to less than 13% by weight, and the content of BaO is preferably 12.5% by weight or less, more preferably 12% by weight or less.

In the glasses 1 to 4, 7 and 9 in which $Li_2O$ is an optional component, preferably, $Li_2O$ is caused to be co-present with the other essential components for further decreasing the sag temperature and more improving the low-temperature softening property. In this case, the content of $Li_2O$ is preferably 1 to 20%, more preferably 2 to 20%.

The glasses 1 to 9 will be explained with regard to their properties.

The glasses 1 and 3 to 8 have a refractive index (nd) of 1.8 or more, preferably 1.82 or more, more preferably over 1.88, and the glasses 2 and 9 have a refractive index (nd) of over 1.88. The glasses 1 to 9 still more preferably have a refractive index (nd) in the range of 1.89 and more, more preferably in the range of 1.9 and more. The upper limit of the refractive index (nd) is not specially limited. However, when the refractive index (nd) is increased to excess, other properties may be impaired, so that it is preferred to use a refractive index (nd) of 2.2 or less as a standard value of the upper limit for preparing each glass composition.

The glasses 1 to 9 have the above refractive index (nd) and also exhibit dispersion properties represented by an Abbe's number (vd) of 35 or less, preferably less than 35, more preferably 34 or less. The lower limit of the Abbe's number (vd) is not specially limited. However, when the Abbe's number (vd) is decreased to excess, other properties may be impaired, so that it is preferred to use an Abbe's number (vd) of 23 or more as a standard value of the lower limit for preparing each glass composition.

The above glasses 1 to 9 have a low-temperature softening property suitable for precision press-molding, which is represented by a sag temperature (Ts) of 670° C. or lower, preferably 650° C. or lower. Each glass has a glass transition temperature (Tg) of 620° C. or lower, preferably 600° C. or lower. The lower limit of each of the sag temperature (Ts) and the glass transition temperature (Tg) is not specially limited. However, these temperatures are decreased to excess, other properties may be impaired, so that it is preferred to use a sag temperature (Ts) of 450° C. or higher and a glass transition temperature (Tg) of 400° C. or higher as a standard value of the lower limit for preparing each glass composition.

The optical glass of the present invention can be produced by preparing oxides, hydroxides, carbonates, nitrates, etc., which correspond to glass components, as glass raw materials, weighing the raw materials so as to obtain an intended glass composition, fully mixing the raw materials, then, heating, melting, refining and homogenizing the raw materials in a melting vessel such as a platinum vessel, or the like, to obtain a molten glass and causing the molten glass to flow out and shaping it. Each of the above procedures can be carried out in atmosphere, and the method for producing the optical glass can be selected from known methods.

[Precision Press-Molding Preform and Process for Producing the Preform]

The precision press-molding preform of the present invention will be explained below.

The precision press-molding preform (to be referred to as "preform" hereinafter) of the present invention is characteristically formed of the optical glass of the present invention.

The preform is a glass shaped material having a weight equivalent to the weight of a precision press-molded product. The preform is shaped in a proper form depending upon the precision press-molded product, and examples of the form include the form of a sphere, the form of a spheroid, and the like. The preform is heated so as to have a viscosity enabling press-molding before its press-molding.

The form of the preform including the above form of a spheroid is preferably a form having one rotational-symmetry axis. The above form having one rotational-symmetry axis includes a form having a smooth contour free of a corner and a dent in a cross section including the above rotational-symmetry axis, such as a form whose contour is an ellipse whose minor axis is aligned with the rotational-symmetry axis in the above cross section. Further, the following form is preferred. When one of angles formed by a line connecting any point on the contour of a preform in the above cross section to the center of the gravity of the preform on the axis of revolution symmetry and a tangent line contacting the contour on the above point on the contour is taken as θ, and when the above point starts at the axis of revolution symmetry and moves along the contour, the angle θ monotonously increases from 90°, then decreases monotonously and then increases monotonously to come to be 90° at the other point where the contour crosses the axis of revolution symmetry.

The above preform may have a thin film such as a mold release film on its surface as required. Examples of the mold release film include a carbon-containing film, a self-organizing film, and the like. The above preform can provide an optical element having predetermined optical constants by press-molding.

The process for producing a preform, provided by the present invention, will be explained below.

The process for producing a preform, provided by the present invention, is a process for producing a precision press-molding preform formed of a glass, which comprises separating a molten glass from a flowing glass and shaping the molten glass into a preform during cooling of the molten glass, wherein said glass is the optical glass of the present invention.

In the above production process, the preform is shaped in a step where the glass in a molten state is cooled, and the glass can be brought into a state where a shaped glass can be used as a preform without machining after solidification of the glass, so that the above production process has an advantage that machining processes such as cutting, grinding, polishing, etc., are not required. In the process for producing a preform, provided by the present invention, further, a preform having a smooth surface can be shaped, and the entire surface of the preform is a surface formed by solidification of the glass in a molten state, so that the surface is smooth and free of fine scratches caused by grinding or latent scratches. On the other hand, in the process for producing a preform, provided by the present invention, a preform free of defects such as devitrification, etc., is shaped directly from a molten glass. The glass used in the process is therefore required to have such particularly excellent stability that the glass does not undergo crystallization from a step in which the glass is caused to flow out to a step in which the glass is shaped into the preform. Having the above excellent stability, the optical glass of the present invention can be suitably used in the process for producing a preform, provided by the present invention.

Desirably, the preform is free of a cutting mark called a shear mark on its surface. The shear mark occurs when a molten glass that is flowing out is cut with a cutting blade. When the shear mark remains in a stage where the preform has been molded into a precision press-molded product, a portion of such a shear mark constitutes a defect. It is therefore preferred to preclude the shear mark in a preform stage. The method for separating a molten glass using no cutting blade so as not to cause any shear mark includes a method in which a molten glass is caused to drop from a flow pipe and a method in which the forward end of a molten glass flow flowing out of a flow pipe is supported and the support is removed at a time when a molten glass gob having a predetermined weight can be separated (to be referred to as "descent cutting method" hereinafter). In the descent cutting method, a glass is separated at a narrow portion generated between the forward end side and the flow pipe side of the molten glass flow, whereby a molten glass gob having a predetermined weight can be obtained.

Then, the thus-obtained molten glass gob is shaped into a form suitable for press molding while it is in a softened state, whereby a preform can be obtained. As a method for shaping the above molten glass gob into a preform, it is preferred to employ a method in which the preform is shaped while the separated glass gob having a predetermined weight is caused to float, or caused to float mostly so as to decrease its contact to a shaping mold, by applying a gas pressure to the molten glass gob (to be referred to as "float shaping" hereinafter). The floating shaping can decrease a contact of the glass having a high temperature to the shaping mold, so that the cracking of a preform can be prevented. Further, a preform of which the entire surface is formed of a free surface can be shaped.

In addition to the above method, a preform can be produced by a method in which a glass block is formed from a molten glass and then processed. A preform formed of the optical glass of the present invention can be also produced by this method. In the above method, there may be employed a constitution in which a glass block formed of the optical glass of the present invention is formed by casting a molten glass into a frame and the glass block is machined to obtain a preform having a predetermined weight. Before the machining, preferably, strain-removing treatment is fully carried out by annealing the glass for preventing cracking of the glass.

In any one of the above methods, high quality preforms free of defects such as devitrification, striae, scratches, a cracking, etc., can be shaped by the use of the optical glass of the present invention in a molten state, since the optical glass of the present invention has high stability.

[Optical Element and Process for Producing the Same]

The optical element of the present invention will be explained below.

The optical element of the present invention is characteristically formed of the above optical glass of the present invention. Due to the optical properties that the optical glass of the present invention has, various optical elements can be obtained as optical elements of the present invention. Examples of the optical elements include various lenses such as a spherical lens, an aspherical lens, a microlens, etc., a diffraction grating, a lens with a diffraction grating, a lens array, a prism, and the like.

The optical element of the present invention may be provided with optical thin films such as an anti-reflection film, a total reflection film, a partial reflection film, a film having spectral characteristics, and the like.

The process for producing an optical element, provided by the present invention, will be explained below.

The process for producing an optical element, provided by the present invention, comprises heating a precision press-molding preform formed of a glass and precision press-molding the preform with a press mold, wherein the above preform is used as the precision press-molding preform.

The process for producing an optical element, provided by the present invention, comprises heating a precision press-molding preform formed of a glass and precision press-molding the preform with a press mold, wherein a preform produced by the above production process is used as the precision press-molding preform.

The above precision press-molding is also called mold optics molding and is known in the filed of art of the present invention. In an optical element, a surface that transmits, refracts, diffracts or reflects light is referred to as an optical-function surface (for example, the lens surface of a lens, such as the aspherical surface of an aspherical lens or the spherical surface of a spherical lens corresponds to the optical-function surface). According to the precision press-molding, the form of molding surface of a press mold is precisely transferred to a glass, so that the optical-function surface can be formed by press molding, and it is no longer required to apply machine processes such as grinding, polishing, etc., for finishing the optical-function surface.

Therefore, the process for producing an optical element, provided by the present invention, is suitable for producing optical elements such as a lens, a lens array, a diffraction grating, a prism, and the like, and is particularly suitable as a process for highly productively producing aspherical lenses.

According to the process for producing an optical element, provided by the present invention, all of the above optical elements having the above optical properties can be produced. Further, since the optical glass has a low glass transition temperature (Tg), the press molding temperature can be decreased, so that damage on the molding surface of a press mold can be decreased, and the lifetime of the press mold can be hence increased. Further, since the optical glass constituting the preform has high stability, the devitrification of the optical glass can be effectively prevented in the re-heating and pressing steps. Further, a series of steps beginning with the melting of the optical glass and ending with the obtainment of a final product can be highly productively carried out.

As a press mold for the precision press-molding, there can be used a known press mold, such as a press mold formed from a refractory ceramic mold material such as silicon carbide, zirconia, alumina, or the like and provided with a mold release film on the molding surface of the mold material. Above all, a press mold formed from silicon carbide is preferred, and a carbon-containing film or the like can be used as a mold release film. A carbon film is particularly preferred from the viewpoint of durability and a cost.

In the precision press-molding, desirably, a non-oxidizing atmosphere is employed as an atmosphere during the precision press-molding for maintaining the molding surface of the press mold under good conditions. As a non-oxidizing gas, nitrogen, a mixture of nitrogen with hydrogen, or the like is preferred.

The precision press-molding for use in the process for producing an optical element, provided by the present invention, includes the following two embodiments, precision press-molding 1 and precision press-molding 2.

(Precision Press-Molding 1)

The precision press-molding 1 is a method in which the press mold and the preform are heated together and the preform is precision press-molded with the press mold.

In the precision press-molding 1, preferably, the precision press-molding is carried out by heating the press mold and the above preform together to a temperature at which the glass constituting the preform exhibits a viscosity of $10^6$ to $10^{12}$ dPa·s.

Further, desirably, a precision press-molded product are taken out of the press mold after they are cooled to a temperature at which the above glass exhibits a viscosity of $10^{12}$ dPa·s or higher, more preferably $10^{14}$ dPa·s or higher, still more preferably $10^{16}$ dPa·s or higher.

Under the above conditions, not only the form of the molding surface of the press mold can be more precisely transferred to the glass, but also the precision press-molded product can be taken out without causing any deformation.

(Precision Press-Molding 2)

The precision press-molding 2 is a method in which the preform that has been pre-heated separately from the press mold is introduced into the press mold that has been pre-heated and the preform is precision press-molded.

In the precision press-molding 2, the above preform is heated before its introduction into the press mold, so that the cycle time can be decreased, and at the same time there can be produced an optical element that is free of surface defects and has an excellent surface accuracy.

Preferably, the temperature for pre-heating the press mold is set at a temperature lower than the temperature for pre-heating the preform. The temperature for pre-heating the press mold is set at a lower temperature in this manner, so that the abrasion of the press mold can be decreased.

In the precision press-molding 2, preferably, the above preform is pre-heated to a temperature at which the glass constituting the preform exhibits a viscosity of $10^9$ dPa·s or less.

Further, it is preferred to pre-heat the above preform while it is caused to float. Further, the above preform is preferably pre-heated to a temperature at which the glass constituting the preform exhibits a viscosity of $10^{5.5}$ to $10^9$ dPa·s, more preferably, a viscosity of $10^{5.5}$ dPa·s or higher but lower than $10^9$ dPa·s.

Preferably, the cooling of the glass is initiated simultaneously with the initiation of the pressing or during the pressing.

The temperature of the press mold is set at a temperature lower than the temperature for pre-heating the above preform, and a temperature at which the above glass exhibits a viscosity of $10^9$ to $10^{12}$ dPa·s can be used as a standard value.

In the above method, preferably, the precision press-molded product is taken out of the mold after it is cooled to a temperature at which the above glass exhibits a viscosity of $10^{12}$ dPa·s or more.

An optical element obtained by the precision press-molding is taken out of the press mold, and it is gradually cooled as required. When the molded product is an optical element such as a lens, or the like, the surface of the optical element may be coated with an optical thin film as required.

EXAMPLES

The present invention will be more specifically explained with reference to Examples hereinafter. The present invention shall not be limited by these Examples.

Oxides, hydroxides, carbonates, nitrates, etc., which corresponded to glass components were used as glass raw materials, the glass raw materials were weighed so as to obtain each of compositions shown in Tables 1-1 to 1-5 and fully mixed, and each of mixtures was separately from the others placed in a platinum crucible and melted under heat at a temperature in the range of 1,200 to 1,250° C. in an electric furnace with stirring in atmosphere for 2 to 4 hours. Each homogenized and refined glass melt was separately cast into a 40×70×15 mm mold made from carbon and allowed to cool gradually to its glass transition temperature. Immediately thereafter, each glass was placed in an annealing furnace and annealed around the glass transition temperature for 1 hour. In the furnace, then, each glass was allowed to cool gradually to room temperature, to give optical glasses Nos. 1 to 34 shown in Tables 1-1 to 1-5.

When each of the obtained glasses was observed by enlarging it through a microscope, no precipitation of a crystal was found, nor was a non-melt remainder found.

Each of the thus-obtained glasses was measured for a refractive index (nd), an Abbe's number (vd), a transition temperature (Tg) and a sag temperature (Ts) as follows, and Table 2 shows the results.

(1) Refractive index (nd) and Abbe's number (vd)

Optical glasses obtained by setting the gradually cooling temperature at −30° C./hour were measured.

(2) Glass transition temperature (Tg) and sag temperature (Ts)

Measured with an apparatus for thermomechanical analysis supplied by Rigaku Corporation at a temperature elevation rate of 4° C./minute.

As shown in Table 2, all of the glasses had desired refractive indexes, Abbe's numbers (vd) and sag temperatures and exhibited excellent low-temperature softening properties and meltability, so that they were suitable as an optical glass for precision press-molding.

Each of refined and homogenized molten glasses having compositions Nos. 1 to 34 shown in Tables 1-1 to 1-5 was separately caused to flow at a constant rate out of a pipe formed of a platinum alloy which was temperature-adjusted to a temperature region in which the glass was stably flowable without undergoing devitrification, and molten glass gobs each having a weight of a preform as an end product were separated by a dropping method or a descent-cutting method. Each of the molten glass gobs was separately received with a receiving mold having a gas-ejecting port in its bottom, and each glass gob was shaped into a press-molding preform while the glass gobs were caused to float by ejecting a gas from the gas-ejecting port. The preforms were shaped in the form of a sphere or a flattened sphere by adjusting and setting the timing of separation of molten glass. The weights of the thus-obtained preforms were precisely in agreement with the corresponding set values, and all of the preforms had smooth surfaces.

Separately, each of the molten glasses was cast into a frame to form plate-shaped glasses, and the plate-shaped glasses were annealed and then cut to obtain glass blocks. The surface of each block was ground and polished to give preforms whose entire surfaces were smooth.

The thus-obtained preforms whose entire surfaces were formed by solidification of glasses in a molten state and the preforms obtained by grinding and polishing the surfaces of the glass blocks were precision press-molded with a press machine shown in FIG. 1, to give aspherical lenses. Specifically, a preform 4 was placed between a lower mold member 2 and an upper mold member 1 which constituted a press mold together with a sleeve member 3, then, a nitrogen atmosphere was introduced into a quartz tube 11, and a heater 12 is electrically powered to heat an inside the quartz tube 11. The temperature in the press mold was set at a temperature at which a glass to be molded exhibited a viscosity of $10^8$ to $10^{10}$ dPa·s, and while this temperature was maintained, the upper mold member 1 was pressed by moving a pressing rod 13 downward to press the preform set in the press mold. The pressing was carried out under a pressure of 8 MPa for 30 seconds. After the pressing, the pressing pressure was removed, the glass molded product was gradually cooled to a temperature at which the above glass exhibited a viscosity of $10^{12}$ dPa·s or higher in a state where the lower mold member and the upper mold member were in contact with each other. Then, the glass molded product was rapidly cooled to room temperature and then taken out of the press mold to give an aspherical lens. The aspherical lenses obtained in the above manner had remarkably high surface accuracy.

The aspherical lenses obtained by the above precision press-molding were provided each with an anti-reflection film as required.

Then, the same preforms as the above preforms were precision press-molded by other method. In this method, while a preform was caused to float, the preform was pre-heated to a temperature at which a glass constituting the preform exhibited a viscosity of $10^8$ dPa·s. Separately, a press mold having an upper mold member, a lower mold member and a sleeve member was heated up to a temperature at which the above glass exhibited a viscosity of $10^9$ to $10^{12}$ dPa·s, and the above pre-heated preform was introduced into the cavity of the press mold to carry out precision press-molding of the preform at a pressure of 10 MPa. Upon the initiation of the pressing, the cooling of the glass and the press mold together was initiated, and the cooling was continued until the molded glass had a viscosity of at least $10^{12}$ dPa·s, and then the molded product was taken out of the mold to give an aspherical lens. The aspherical lenses obtained in the above manner were lenses having remarkably high surface accuracy.

The aspherical lenses obtained by the precision press-molding were provided each with an anti-reflection film as required.

In the above manner, optical elements formed of the glasses having high internal quality were highly productively and highly precisely obtained.

TABLE 1-1

| | | \multicolumn{6}{c}{No.} | | | | | |
|---|---|---|---|---|---|---|---|
| | | 1 | 2 | 3 | 4 | 5 | 6 |
| | | \multicolumn{6}{c}{Corresponding glass} | | | | | |
| | | Glasses 1, 2, 9 | Glasses 1, 2, 9 | Glasses 1~3, 7, 9 | Glasses 1~3, 7, 9 | Glasses 1~3, 7, 9 | Glasses 1~3, 7, 9 |
| $B_2O_3$ | mol % | 23.94 | 23.94 | 23.94 | 23.94 | 23.94 | 23.94 |
| | wt % | 13.45 | 13.68 | 13.91 | 14.15 | 14.08 | 13.91 |
| $SiO_2$ | mol % | 14.08 | 14.08 | 14.08 | 14.08 | 14.08 | 14.08 |
| | wt % | 6.83 | 6.94 | 7.06 | 7.18 | 7.15 | 7.06 |
| $TiO_2$ | mol % | 19.73 | 19.73 | 19.73 | 19.73 | 19.72 | 19.72 |
| | wt % | 12.71 | 12.92 | 13.14 | 13.37 | 13.32 | 13.15 |
| ZnO | mol % | 9.86 | 12.68 | 15.49 | 18.31 | 18.31 | 18.31 |
| | wt % | 6.48 | 8.46 | 10.52 | 12.65 | 12.59 | 12.44 |
| $La_2O_3$ | mol % | 14.08 | 14.08 | 14.08 | 14.08 | 12.68 | 12.68 |
| | wt % | 37.03 | 37.65 | 38.28 | 38.94 | 34.89 | 34.47 |
| $Gd_2O_3$ | mol % | 0.00 | 0.00 | 0.00 | 0.00 | 1.41 | 0.00 |
| | wt % | 0.00 | 0.00 | 0.00 | 0.00 | 4.31 | 0.00 |
| $Nb_2O_5$ | mol % | 2.82 | 2.82 | 2.82 | 2.82 | 2.82 | 2.82 |
| | wt % | 6.04 | 6.14 | 6.25 | 6.35 | 6.33 | 6.25 |
| $ZrO_2$ | mol % | 7.04 | 7.04 | 7.04 | 7.04 | 7.04 | 7.04 |
| | wt % | 7.00 | 7.12 | 7.24 | 7.36 | 7.33 | 7.24 |
| $Ta_2O_5$ | mol % | 0.00 | 0.00 | 0.00 | 0.00 | 0.00 | 0.00 |
| | wt % | 0.00 | 0.00 | 0.00 | 0.00 | 0.00 | 0.00 |
| $Bi_2O_3$ | mol % | 0.00 | 0.00 | 0.00 | 0.00 | 0.00 | 1.41 |
| | wt % | 0.00 | 0.00 | 0.00 | 0.00 | 0.00 | 5.48 |
| MgO | mol % | 0.00 | 0.00 | 0.00 | 0.00 | 0.00 | 0.00 |
| | wt % | 0.00 | 0.00 | 0.00 | 0.00 | 0.00 | 0.00 |
| CaO | mol % | 0.00 | 0.00 | 0.00 | 0.00 | 0.00 | 0.00 |
| | wt % | 0.00 | 0.00 | 0.00 | 0.00 | 0.00 | 0.00 |
| SrO | mol % | 0.00 | 0.00 | 0.00 | 0.00 | 0.00 | 0.00 |
| | wt % | 0.00 | 0.00 | 0.00 | 0.00 | 0.00 | 0.00 |
| BaO | mol % | 8.45 | 5.63 | 2.82 | 0.00 | 0.00 | 0.00 |
| | wt % | 10.46 | 7.09 | 3.60 | 0.00 | 0.00 | 0.00 |
| RO | mol % | 8.45 | 5.63 | 2.82 | 0.00 | 0.00 | 0.00 |
| | wt % | 10.46 | 7.09 | 3.60 | 0.00 | 0.00 | 0.00 |
| $Li_2O$ | mol % | 0.00 | 0.00 | 0.00 | 0.00 | 0.00 | 0.00 |
| | wt % | 0.00 | 0.00 | 0.00 | 0.00 | 0.00 | 0.00 |
| $Na_2O$ | mol % | 0.00 | 0.00 | 0.00 | 0.00 | 0.00 | 0.00 |
| | wt % | 0.00 | 0.00 | 0.00 | 0.00 | 0.00 | 0.00 |
| $Sb_2O_3$ | mol % | 0.00 | 0.00 | 0.00 | 0.00 | 0.00 | 0.00 |
| | wt % | 0.00 | 0.00 | 0.00 | 0.00 | 0.00 | 0.00 |
| Total | mol % | 100.00 | 100.00 | 100.00 | 100.00 | 100.00 | 100.00 |
| | wt % | 100.00 | 100.00 | 100.00 | 100.00 | 100.00 | 100.00 |

(Note)
RO represents a total content of MgO, CaO, SrO and BaO.

TABLE 1-2

| | | \multicolumn{6}{c}{No.} | | | | | |
|---|---|---|---|---|---|---|---|
| | | 7 | 8 | 9 | 10 | 11 | 12 |
| | | \multicolumn{6}{c}{Corresponding glass} | | | | | |
| | | Glasses 1~3, 7, 9 | Glasses 1~3, 7, 9 | Glasses 1~3, 7, 9 | Glasses 1~3, 7, 9 | Glasses 1~3, 7, 9 | Glasses 1~3, 7, 9 |
| $B_2O_3$ | mol % | 23.94 | 22.22 | 24.29 | 21.38 | 19.73 | 24.46 |
| | wt % | 14.29 | 13.30 | 14.52 | 12.81 | 11.85 | 14.64 |
| $SiO_2$ | mol % | 14.08 | 13.89 | 14.29 | 13.79 | 13.61 | 14.39 |
| | wt % | 7.25 | 7.17 | 7.37 | 7.13 | 7.06 | 7.43 |
| $TiO_2$ | mol % | 19.72 | 19.44 | 19.98 | 19.31 | 19.04 | 20.13 |
| | wt % | 13.50 | 13.35 | 13.72 | 13.29 | 13.13 | 13.84 |
| ZnO | mol % | 21.13 | 23.61 | 18.57 | 24.83 | 27.21 | 17.27 |
| | wt % | 14.74 | 16.52 | 12.98 | 17.39 | 19.12 | 12.08 |
| $La_2O_3$ | mol % | 14.08 | 13.89 | 14.29 | 13.79 | 13.61 | 14.39 |
| | wt % | 39.34 | 38.90 | 39.98 | 38.68 | 38.26 | 40.31 |
| $Gd_2O_3$ | mol % | 0.00 | 0.00 | 0.00 | 0.00 | 0.00 | 0.00 |
| | wt % | 0.00 | 0.00 | 0.00 | 0.00 | 0.00 | 0.00 |
| $Nb_2O_5$ | mol % | 2.82 | 2.78 | 2.86 | 2.76 | 2.72 | 2.88 |
| | wt % | 6.42 | 6.35 | 6.52 | 6.31 | 6.24 | 6.58 |
| $ZrO_2$ | mol % | 4.23 | 4.17 | 4.29 | 4.14 | 4.08 | 4.32 |
| | wt % | 4.46 | 4.41 | 4.54 | 4.39 | 4.34 | 4.57 |

TABLE 1-2-continued

| | | No. | | | | | |
|---|---|---|---|---|---|---|---|
| | | 7 | 8 | 9 | 10 | 11 | 12 |
| | | Corresponding glass | | | | | |
| | | Glasses 1~3, 7, 9 | Glasses 1~3, 7, 9 | Glasses 1~3, 7, 9 | Glasses 1~3, 7, 9 | Glasses 1~3, 7, 9 | Glasses 1~3, 7, 9 |
| Ta2O5 | mol % | 0.00 | 0.00 | 0.00 | 0.00 | 0.00 | 0.00 |
| | wt % | 0.00 | 0.00 | 0.00 | 0.00 | 0.00 | 0.00 |
| Bi2O3 | mol % | 0.00 | 0.00 | 0.00 | 0.00 | 0.00 | 0.00 |
| | wt % | 0.00 | 0.00 | 0.00 | 0.00 | 0.00 | 0.00 |
| MgO | mol % | 0.00 | 0.00 | 0.00 | 0.00 | 0.00 | 0.00 |
| | wt % | 0.00 | 0.00 | 0.00 | 0.00 | 0.00 | 0.00 |
| CaO | mol % | 0.00 | 0.00 | 0.00 | 0.00 | 0.00 | 0.00 |
| | wt % | 0.00 | 0.00 | 0.00 | 0.00 | 0.00 | 0.00 |
| SrO | mol % | 0.00 | 0.00 | 0.00 | 0.00 | 0.00 | 0.00 |
| | wt % | 0.00 | 0.00 | 0.00 | 0.00 | 0.00 | 0.00 |
| BaO | mol % | 0.00 | 0.00 | 0.00 | 0.00 | 0.00 | 0.00 |
| | wt % | 0.00 | 0.00 | 0.00 | 0.00 | 0.00 | 0.00 |
| RO | mol % | 0.00 | 0.00 | 0.00 | 0.00 | 0.00 | 0.00 |
| | wt % | 0.00 | 0.00 | 0.00 | 0.00 | 0.00 | 0.00 |
| Li2O | mol % | 0.00 | 0.00 | 1.43 | 0.00 | 0.00 | 2.16 |
| | wt % | 0.00 | 0.00 | 0.37 | 0.00 | 0.00 | 0.55 |
| Na2O | mol % | 0.00 | 0.00 | 0.00 | 0.00 | 0.00 | 0.00 |
| | wt % | 0.00 | 0.00 | 0.00 | 0.00 | 0.00 | 0.00 |
| Sb2O3 | mol % | 0.00 | 0.00 | 0.00 | 0.00 | 0.00 | 0.00 |
| | wt % | 0.00 | 0.00 | 0.00 | 0.00 | 0.00 | 0.00 |
| Total | mol % | 100.00 | 100.00 | 100.00 | 100.00 | 100.00 | 100.00 |
| | wt % | 100.00 | 100.00 | 100.00 | 100.00 | 100.00 | 100.00 |

(Note)
RO represents a total content of MgO, CaO, SrO and BaO.

TABLE 1-3

| | | No. | | | | | |
|---|---|---|---|---|---|---|---|
| | | 13 | 14 | 15 | 16 | 17 | 18 |
| | | Corresponding glass | | | | | |
| | | Glasses 1~3, 7, 9 | Glasses 1~3, 7, 9 | Glasses 1~4, 7, 9 | Glasses 1~4, 7, 9 | Glasses 1~5, 7 | Glasses 1~3, 7, 9 |
| B2O3 | mol % | 24.82 | 23.94 | 25.00 | 25.37 | 26.15 | 23.53 |
| | wt % | 14.89 | 14.43 | 15.01 | 15.27 | 15.81 | 14.20 |
| SiO2 | mol % | 14.60 | 14.08 | 14.71 | 14.93 | 15.38 | 14.71 |
| | wt % | 7.56 | 7.33 | 7.62 | 7.75 | 8.03 | 7.66 |
| TiO2 | mol % | 20.43 | 19.73 | 20.58 | 20.88 | 21.54 | 20.58 |
| | wt % | 14.05 | 13.64 | 14.19 | 14.43 | 14.93 | 14.26 |
| ZnO | mol % | 14.60 | 23.94 | 13.24 | 10.45 | 4.62 | 13.24 |
| | wt % | 10.24 | 16.88 | 9.29 | 7.35 | 3.26 | 9.34 |
| La2O3 | mol % | 14.60 | 14.08 | 14.71 | 14.93 | 15.38 | 14.71 |
| | wt % | 40.98 | 39.74 | 41.32 | 42.03 | 43.53 | 41.53 |
| Gd2O3 | mol % | 0.00 | 0.00 | 0.00 | 0.00 | 0.00 | 0.00 |
| | wt % | 0.00 | 0.00 | 0.00 | 0.00 | 0.00 | 0.00 |
| Nb2O5 | mol % | 2.92 | 2.82 | 2.94 | 2.99 | 3.08 | 2.94 |
| | wt % | 6.69 | 6.48 | 6.74 | 6.86 | 7.10 | 6.78 |
| ZrO2 | mol % | 4.38 | 1.41 | 4.41 | 4.48 | 4.62 | 4.41 |
| | wt % | 4.65 | 1.50 | 4.69 | 4.77 | 4.94 | 4.71 |
| Ta2O5 | mol % | 0.00 | 0.00 | 0.00 | 0.00 | 0.00 | 0.00 |
| | wt % | 0.00 | 0.00 | 0.00 | 0.00 | 0.00 | 0.00 |
| Bi2O3 | mol % | 0.00 | 0.00 | 0.00 | 0.00 | 0.00 | 0.00 |
| | wt % | 0.00 | 0.00 | 0.00 | 0.00 | 0.00 | 0.00 |
| MgO | mol % | 0.00 | 0.00 | 0.00 | 0.00 | 0.00 | 0.00 |
| | wt % | 0.00 | 0.00 | 0.00 | 0.00 | 0.00 | 0.00 |
| CaO | mol % | 0.00 | 0.00 | 0.00 | 0.00 | 0.00 | 0.00 |
| | wt % | 0.00 | 0.00 | 0.00 | 0.00 | 0.00 | 0.00 |
| SrO | mol % | 0.00 | 0.00 | 0.00 | 0.00 | 0.00 | 0.00 |
| | wt % | 0.00 | 0.00 | 0.00 | 0.00 | 0.00 | 0.00 |
| BaO | mol % | 0.00 | 0.00 | 0.00 | 0.00 | 0.00 | 0.00 |
| | wt % | 0.00 | 0.00 | 0.00 | 0.00 | 0.00 | 0.00 |
| RO | mol % | 0.00 | 0.00 | 0.00 | 0.00 | 0.00 | 0.00 |
| | wt % | 0.00 | 0.00 | 0.00 | 0.00 | 0.00 | 0.00 |
| Li2O | mol % | 3.65 | 0.00 | 4.41 | 5.97 | 9.23 | 5.88 |
| | wt % | 0.94 | 0.00 | 1.14 | 1.54 | 2.40 | 1.52 |

TABLE 1-3-continued

|  |  | No. |  |  |  |  |  |
|---|---|---|---|---|---|---|---|
|  |  | 13 | 14 | 15 | 16 | 17 | 18 |
|  |  | Corresponding glass |  |  |  |  |  |
|  |  | Glasses 1~3, 7, 9 | Glasses 1~3, 7, 9 | Glasses 1~4, 7, 9 | Glasses 1~4, 7, 9 | Glasses 1~5, 7 | Glasses 1~3, 7, 9 |
| Na2O | mol % | 0.00 | 0.00 | 0.00 | 0.00 | 0.00 | 0.00 |
|  | wt % | 0.00 | 0.00 | 0.00 | 0.00 | 0.00 | 0.00 |
| Sb2O3 | mol % | 0.00 | 0.00 | 0.00 | 0.00 | 0.00 | 0.00 |
|  | wt % | 0.00 | 0.00 | 0.00 | 0.00 | 0.00 | 0.00 |
| Total | mol % | 100.00 | 100.00 | 100.00 | 100.00 | 100.00 | 100.00 |
|  | wt % | 100.00 | 100.00 | 100.00 | 100.00 | 100.00 | 100.00 |

(Note)
RO represents a total content of MgO, CaO, SrO and BaO.

TABLE 1-4

|  |  | No. |  |  |  |  |  |  |
|---|---|---|---|---|---|---|---|---|
|  |  | 19 | 20 | 21 | 22 | 23 | 24 | 25 |
|  |  | Corresponding glass |  |  |  |  |  |  |
|  |  | Glasses 1~3, 7, 9 | Glasses 1~3, 7, 9 | Glasses 1~3, 7, 9 | Glasses 1~3, 7, 9 | Glasses 1~3, 7, 9 | Glasses 1~3, 7, 9 | Glasses 1~3, 7 |
| B2O3 | mol % | 21.74 | 20.00 | 22.63 | 22.63 | 22.63 | 22.30 | 21.99 |
|  | wt % | 13.16 | 12.14 | 13.68 | 13.79 | 13.90 | 14.06 | 14.46 |
| SiO2 | mol % | 14.49 | 14.29 | 14.60 | 14.60 | 14.60 | 14.39 | 14.18 |
|  | wt % | 7.57 | 7.48 | 7.61 | 7.68 | 7.74 | 7.83 | 8.05 |
| TiO2 | mol % | 20.29 | 19.99 | 20.44 | 20.43 | 20.43 | 20.13 | 19.86 |
|  | wt % | 14.07 | 13.92 | 14.17 | 14.28 | 14.40 | 14.57 | 14.99 |
| ZnO | mol % | 15.94 | 18.57 | 14.60 | 10.95 | 7.30 | 14.39 | 14.18 |
|  | wt % | 11.28 | 13.18 | 10.31 | 7.80 | 5.24 | 10.60 | 10.90 |
| La2O3 | mol % | 14.49 | 14.29 | 14.60 | 14.60 | 14.60 | 12.95 | 11.35 |
|  | wt % | 41.05 | 40.57 | 41.29 | 41.62 | 41.96 | 38.19 | 34.92 |
| Gd2O3 | mol % | 0.00 | 0.00 | 0.00 | 0.00 | 0.00 | 0.00 | 0.00 |
|  | wt % | 0.00 | 0.00 | 0.00 | 0.00 | 0.00 | 0.00 | 0.00 |
| Nb2O5 | mol % | 2.90 | 2.86 | 2.92 | 2.92 | 2.92 | 2.88 | 2.84 |
|  | wt % | 6.70 | 6.62 | 6.74 | 6.79 | 6.85 | 6.92 | 7.12 |
| ZrO2 | mol % | 4.35 | 4.29 | 4.38 | 4.38 | 4.38 | 4.32 | 4.26 |
|  | wt % | 4.66 | 4.60 | 4.68 | 4.72 | 4.76 | 4.81 | 4.95 |
| Ta2O5 | mol % | 0.00 | 0.00 | 0.00 | 0.00 | 0.00 | 0.00 | 0.00 |
|  | wt % | 0.00 | 0.00 | 0.00 | 0.00 | 0.00 | 0.00 | 0.00 |
| Bi2O3 | mol % | 0.00 | 0.00 | 0.00 | 0.00 | 0.00 | 0.00 | 0.00 |
|  | wt % | 0.00 | 0.00 | 0.00 | 0.00 | 0.00 | 0.00 | 0.00 |
| MgO | mol % | 0.00 | 0.00 | 0.00 | 0.00 | 0.00 | 0.00 | 0.00 |
|  | wt % | 0.00 | 0.00 | 0.00 | 0.00 | 0.00 | 0.00 | 0.00 |
| CaO | mol % | 0.00 | 0.00 | 0.00 | 3.65 | 7.30 | 2.88 | 5.67 |
|  | wt % | 0.00 | 0.00 | 0.00 | 1.79 | 3.61 | 1.46 | 3.01 |
| SrO | mol % | 0.00 | 0.00 | 0.00 | 0.00 | 0.00 | 0.00 | 0.00 |
|  | wt % | 0.00 | 0.00 | 0.00 | 0.00 | 0.00 | 0.00 | 0.00 |
| BaO | mol % | 0.00 | 0.00 | 0.00 | 0.00 | 0.00 | 0.00 | 0.00 |
|  | wt % | 0.00 | 0.00 | 0.00 | 0.00 | 0.00 | 0.00 | 0.00 |
| RO | mol % | 0.00 | 0.00 | 0.00 | 3.65 | 7.30 | 2.88 | 5.67 |
|  | wt % | 0.00 | 0.00 | 0.00 | 1.79 | 3.61 | 1.46 | 3.01 |
| Li2O | mol % | 5.80 | 5.71 | 5.84 | 5.84 | 5.84 | 5.76 | 5.67 |
|  | wt % | 1.51 | 1.49 | 1.51 | 1.53 | 1.54 | 1.56 | 1.60 |
| Na2O | mol % | 0.00 | 0.00 | 0.00 | 0.00 | 0.00 | 0.00 | 0.00 |
|  | wt % | 0.00 | 0.00 | 0.00 | 0.00 | 0.00 | 0.00 | 0.00 |
| Sb2O3 | mol % | 0.00 | 0.00 | 0.00 | 0.00 | 0.00 | 0.00 | 0.00 |
|  | wt % | 0.00 | 0.00 | 0.00 | 0.00 | 0.00 | 0.00 | 0.00 |
| Total | mol % | 100.00 | 100.00 | 100.00 | 100.00 | 100.00 | 100.00 | 100.00 |
|  | wt % | 100.00 | 100.00 | 100.00 | 100.00 | 100.00 | 100.00 | 100.00 |

(Note)
RO represents a total content of MgO, CaO, SrO and BaO.

TABLE 1-5

| | | No. | | | | | | | | |
|---|---|---|---|---|---|---|---|---|---|---|
| | | 26 | 27 | 28 | 29 | 30 | 31 | 32 | 33 | 34 |
| | | | | | | Corresponding glass | | | | |
| | | Glasses 1, 3~7 | Glasses 1~9 | Glasses 1, 3~7 | Glasses 1~9 | Glasses 1~3, 7, 9 | Glasses 1, 2, 9 | Glasses 1~3, 7, 9 | Glasses 1~5, 7, 9 | Glasses 1~3, 7, 9 |
| B2O3 | mol % | 27.01 | 26.15 | 29.69 | 29.69 | 22.63 | 22.63 | 22.30 | 26.15 | 20.00 |
| | wt % | 18.87 | 15.72 | 18.45 | 18.32 | 13.37 | 13.08 | 13.88 | 15.81 | 12.14 |
| SiO2 | mol % | 14.60 | 12.31 | 15.63 | 9.38 | 14.60 | 14.60 | 14.39 | 15.38 | 14.29 |
| | wt % | 8.80 | 6.38 | 8.38 | 4.99 | 7.44 | 7.28 | 7.73 | 8.03 | 7.48 |
| TiO2 | mol % | 20.43 | 21.54 | 18.74 | 21.86 | 20.43 | 20.43 | 20.13 | 21.54 | 19.99 |
| | wt % | 16.37 | 14.86 | 13.37 | 15.48 | 13.86 | 13.56 | 14.38 | 14.93 | 13.92 |
| ZnO | mol % | 14.60 | 7.69 | 4.69 | 7.81 | 10.95 | 7.30 | 14.39 | 4.62 | 18.57 |
| | wt % | 11.92 | 5.41 | 3.41 | 5.64 | 7.56 | 4.93 | 10.47 | 3.26 | 13.18 |
| La2O3 | mol % | 8.76 | 15.38 | 14.84 | 14.06 | 14.60 | 14.60 | 12.95 | 15.38 | 14.29 |
| | wt % | 28.64 | 43.28 | 43.17 | 40.61 | 40.37 | 39.49 | 37.73 | 43.53 | 40.57 |
| Gd2O3 | mol % | 0.00 | 0.00 | 0.00 | 0.00 | 0.00 | 0.00 | 0.00 | 0.00 | 0.00 |
| | wt % | 0.00 | 0.00 | 0.00 | 0.00 | 0.00 | 0.00 | 0.00 | 0.00 | 0.00 |
| Nb2O5 | mol % | 2.92 | 3.08 | 2.34 | 3.13 | 2.92 | 2.92 | 2.88 | 3.08 | 2.86 |
| | wt % | 7.79 | 7.06 | 5.56 | 7.36 | 6.59 | 6.44 | 6.84 | 7.10 | 6.62 |
| ZrO2 | mol % | 4.38 | 4.62 | 4.69 | 4.69 | 4.38 | 4.38 | 4.32 | 4.62 | 4.29 |
| | wt % | 5.42 | 4.91 | 5.16 | 5.12 | 4.58 | 4.48 | 4.76 | 4.94 | 4.60 |
| Ta2O5 | mol % | 0.00 | 0.00 | 0.00 | 0.00 | 0.00 | 0.00 | 0.00 | 0.00 | 0.00 |
| | wt % | 0.00 | 0.00 | 0.00 | 0.00 | 0.00 | 0.00 | 0.00 | 0.00 | 0.00 |
| Bi2O3 | mol % | 0.00 | 0.00 | 0.00 | 0.00 | 0.00 | 0.00 | 0.00 | 0.00 | 0.00 |
| | wt % | 0.00 | 0.00 | 0.00 | 0.00 | 0.00 | 0.00 | 0.00 | 0.00 | 0.00 |
| MgO | mol % | 0.00 | 0.00 | 0.00 | 0.00 | 0.00 | 0.00 | 0.00 | 0.00 | 0.00 |
| | wt % | 0.00 | 0.00 | 0.00 | 0.00 | 0.00 | 0.00 | 0.00 | 0.00 | 0.00 |
| CaO | mol % | 0.00 | 0.00 | 0.00 | 0.00 | 0.00 | 0.00 | 0.00 | 0.00 | 0.00 |
| | wt % | 0.00 | 0.00 | 0.00 | 0.00 | 0.00 | 0.00 | 0.00 | 0.00 | 0.00 |
| SrO | mol % | 0.00 | 0.00 | 0.00 | 0.00 | 0.00 | 0.00 | 2.88 | 0.00 | 0.00 |
| | wt % | 0.00 | 0.00 | 0.00 | 0.00 | 0.00 | 0.00 | 2.67 | 0.00 | 0.00 |
| BaO | mol % | 0.00 | 0.00 | 0.00 | 0.00 | 3.65 | 7.30 | 0.00 | 0.00 | 0.00 |
| | wt % | 0.00 | 0.00 | 0.00 | 0.00 | 4.75 | 9.29 | 0.00 | 0.00 | 0.00 |
| RO | mol % | 0.00 | 0.00 | 0.00 | 0.00 | 3.65 | 7.30 | 2.88 | 0.00 | 0.00 |
| | wt % | 0.00 | 0.00 | 0.00 | 0.00 | 4.75 | 9.29 | 2.67 | 0.00 | 0.00 |
| Li2O | mol % | 7.30 | 9.23 | 9.38 | 9.38 | 5.84 | 5.84 | 5.76 | 9.23 | 5.71 |
| | wt % | 2.19 | 2.38 | 2.50 | 2.48 | 1.48 | 1.45 | 1.54 | 2.40 | 1.49 |
| Na2O | mol % | 0.00 | 0.00 | 0.00 | 0.00 | 0.00 | 0.00 | 0.00 | 0.00 | 0.00 |
| | wt % | 0.00 | 0.00 | 0.00 | 0.00 | 0.00 | 0.00 | 0.00 | 0.00 | 0.00 |
| Sb2O3 | mol % | 0.00 | 0.00 | 0.00 | 0.00 | 0.00 | 0.00 | 0.00 | 0.00 | 0.00 |
| | wt % | 0.00 | 0.00 | 0.00 | 0.00 | 0.00 | 0.00 | 0.00 | 0.00 | 0.00 |
| Total | mol % | 100.00 | 100.00 | 100.00 | 100.00 | 100.00 | 100.00 | 100.00 | 100.00 | 100.00 |
| | wt % | 100.00 | 100.00 | 100.00 | 100.00 | 100.00 | 100.00 | 100.00 | 100.00 | 100.00 |

(Note)
RO represents a total content of MgO, CaO, SrO and BaO.

TABLE 2

| No. | Refractive index (nd) | Abbe's number (vd) | Glass transition temperature (Tg) [° C.] | Sag temperature (TS) [° C.] |
|---|---|---|---|---|
| 1 | 1.90996 | 31.39 | 628 | 678 |
| 2 | 1.91491 | 30.55 | 624 | 674 |
| 3 | 1.91870 | 30.35 | 618 | 668 |
| 4 | 1.92306 | 30.00 | 615 | 664 |
| 5 | 1.92181 | 29.99 | 616 | 664 |
| 6 | 1.93390 | 28.51 | 606 | 654 |
| 7 | 1.91623 | 30.13 | 606 | 655 |
| 8 | 1.92175 | 30.01 | 605 | 654 |
| 9 | 1.91507 | 30.13 | 593 | 644 |
| 10 | 1.92393 | 29.98 | 602 | 651 |
| 11 | 1.92937 | 29.88 | 600 | 651 |
| 12 | 1.91394 | 30.22 | 590 | 640 |
| 13 | 1.91224 | 30.27 | 583 | 634 |
| 14 | 1.90840 | 30.22 | 600 | 647 |
| 15 | 1.91131 | 30.23 | 579 | 634 |
| 16 | 1.90866 | 30.12 | 575 | 627 |
| 17 | 1.90336 | 30.34 | 571 | 624 |
| 18 | 1.91418 | 30.07 | 566 | 622 |
| 19 | 1.91949 | 30.01 | 564 | 619 |
| 20 | 1.92439 | 29.92 | 561 | 617 |
| 21 | 1.91646 | 29.97 | 568 | 622 |
| 22 | 1.91795 | 30.10 | 573 | 626 |
| 23 | 1.91944 | 30.40 | 578 | 631 |
| 24 | 1.90521 | 30.60 | 561 | 615 |
| 25 | 1.89323 | 31.40 | 552 | 608 |
| 26 | 1.87618 | 29.13 | 544 | 595 |
| 27 | 1.91261 | 29.54 | 556 | 612 |
| 28 | 1.87167 | 32.22 | 569 | 619 |
| 29 | 1.90800 | 29.72 | 553 | 604 |
| 30 | 1.91119 | 30.36 | 572 | 627 |
| 31 | 1.90548 | 30.78 | 576 | 631 |
| 32 | 1.90829 | 30.06 | 565 | 618 |
| 33 | 1.90336 | 30.34 | 571 | 624 |
| 34 | 1.92439 | 29.92 | 561 | 617 |

INDUSTRIAL UTILITY

According to the present invention, there can be obtained an optical glass having a high refractive index and a low sag temperature and having a low-temperature softening property enabling precision press-molding, and precision press-molding preforms and optical elements such as various lenses, etc., can be produced from the above optical glass.

The invention claimed is:

1. A process for producing an optical element, which comprises heating a precision press-molding preform and precision press-molding the preform with a mold, said precision press-molding preform being formed of an optical glass comprising, by mol %, 5 to 25.37% of $B_2O_3$,
3 to 50% of $SiO_2$,
10 to 40% of $TiO_2$,
10.45 to 40% of ZnO,
5 to 20% of $La_2O_3$
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 6% of MgO,
0 to 8% of CaO,
0 to 10% of SrO,
0 to 6% of BaO
provided that the total content of MgO, CaO, SrO and BaO is 15% or less,
0 to 20% of $Li_2O$, and
0 to 5% of $Na_2O$,
containing no PbO or $As_2O_3$, optionally containing not more than 1% by weight of $Sb_2O_3$ as a refining agent, having a refractive index (nd) of over 1.88 and an Abbe's number (vd) of 35 or less and having a glass transition temperature of 620° C. or lower.

2. A process for producing an optical element, which comprises heating a precision press-molding preform and precision press-molding the preform with a mold, said precision press-molding preform being formed of an optical glass comprising, by mol %, 5 to 25.37% of $B_2O_3$,
3 to 50% of $SiO_2$,
10 to 40% of $TiO_2$,
10.45 to 40% of ZnO,
5 to 20% of $La_2O_3$,
0 to 10% of $Gd_2O_3$,
0 to 15% of $Nb_2O_5$,
0 to 10% of $ZrO_2$,
0 to 5% of $Ta_2O_5$,
0 to 10% of $Bi_2O_3$,
0 to 6% of MgO,
0 to 8% of CaO,
0 to 10% of SrO,
0 to 6% of BaO,
0 to 20% of $Li_2O$,
0 to 5% of $Na_2O$,
provided that the content of $Sb_2O_3$ is 1% by weight or less, containing no PbO or $As_2O_3$, having a refractive index (nd) of over 1.88 and an Abbe's number (vd) of 35 or less, and having a glass transition temperature of 620° C. or lower.

3. The process for producing an optical element as recited in claim 1 or 2, wherein the press mold and the preform are heated together to precision press-mold the preform with the press mold.

4. The process for producing an optical element as recited in claim 1 or 2, wherein the press mold is pre-heated, and the preform is pre-heated separately from the press mold and introduced into the pre-heated press mold to precision press-mold the preform with the press mold.

5. The process of claim 1 or 2, wherein the preform is formed of the optical glass containing 1 to 20 mol % of $Li_2O$.

6. The process of claim 5, wherein the preform is formed of the optical glass containing 2 to 20 mol % of $Li_2O$.

7. The process of claim 6, wherein the preform is formed of the optical glass containing 4 to 15 mol % of $Li_2O$.

8. The process of claim 1 or 2, wherein the preform is formed of the optical glass having an Abbe's number (vd) of 34 or less.

9. The process of claim 1 or 2, wherein the preform is formed of the optical glass having a sag temperature of 670° C. or lower.

* * * * *